United States Patent [19]

Sawamura et al.

[11] Patent Number: 4,714,308
[45] Date of Patent: Dec. 22, 1987

[54] ULTRAVIOLET REFLECTING MIRROR

[75] Inventors: Mitsuharu Sawamura, Yokohama; Yasushi Taniguchi, Tokyo, both of Japan

[73] Assignee: Canon Kabushiki Kaisha, Tokyo, Japan

[21] Appl. No.: 705,521

[22] Filed: Feb. 26, 1985

[30] Foreign Application Priority Data

Feb. 29, 1984 [JP] Japan ................................ 59-35959

[51] Int. Cl.$^4$ ............................................. G02B 5/28
[52] U.S. Cl. ........................................ 350/1.7; 350/166
[58] Field of Search ................... 350/1.1, 1.7, 164, 166

[56] References Cited

U.S. PATENT DOCUMENTS 3,851,973 12/1974 Mjcek .................................. 350/164
4,320,936 3/1982 Sawamura ........................... 350/1.6

FOREIGN PATENT DOCUMENTS 2939204 4/1980 Fed. Rep. of Germany.

Primary Examiner—Bruce Y. Arnold
Attorney, Agent, or Firm—Fitzpatrick, Cella, Harper & Scinto

[57] ABSTRACT

An ultraviolet reflecting mirror comprises a substrate, a high reflection factor film provided on the substrate and having a film thickness of at least 250 Å and reflecting a light beam by the surface thereof, and a group of dielectric material layers comprising one or more sets of two layers of low refractive index film and high refractive index film provided on the high reflection factor film. The low refractive index film is provided on the high reflection factor film. The optical film thickness of the high refractive index film and the low refractive index film is approximately $\frac{1}{4}(2n-1)\lambda$, where n is a natural number and $\lambda$ is the design wavelength and $150nm \leq \lambda \leq 300nm$. The film thickness of at least one of the high refractive index film and the low refractive index film is $3\lambda/4$.

6 Claims, 5 Drawing Figures

ULTRAVIOLET REFLECTING MIRROR

BACKGROUND OF THE INVENTION

1. Field of the Invention

This invention relates to a mirror for reflecting ultraviolet rays, and particularly to an improvement in the film construction of an ultraviolet reflecting mirror.

The ultraviolet reflecting mirror according to the present invention is used, for example, in an ultraviolet ray exposure apparatus in the manufacture of integrated circuits.

2. Description of the Prior Art

To obtain a high resolution and a high through-put in an ultraviolet ray exposure apparatus, it is advantageous to use a light of short wavelength. Therefore, today, the wavelength of the ultraviolet rays used is shifting from 230–250 nm (hereinafter referred to as deep U. V.) to the vacuum ultraviolet range of 170–190 nm.

In ultraviolet reflecting mirrors it is popular to use an aluminum (Al) film in order to obtain a high reflection factor in the deep U.V. and the vacuum ultraviolet range. However, the Al film will be remarkably reduced in reflection factor in no overcoat is present thereon. For example, if the Al film is left in the atmosphere for a month, the reflection factor thereof will be reduced to ~70% for a wavelength 170 nm used.

Thus, the conventional reflecting mirrors have used an $MgF_2$ film or an LiF film as the overcoat. The film thickness is optically $\lambda/2$ when the wavelength used is $\lambda$.

FIG. 1 of the accompanying drawings is a graph showing the reflection factor of only the Al film, and FIG. 2 of the accompanying drawings is a graph showing the reflection factor when an $MgF_2$ film having a thickness of ~550 Å was provided on the Al film. The reflection factors of the S component and the P component when the wavelength used is 170–200 nm (vacuum ultraviolet range) and the angle of incidence onto the mirror is 45° are Rs and Rp, respectively.

As is apparent from the comparison between FIG. 1 and FIG. 2, the $MgF_2$ film does not contribute to the improvement of the reflection factor. However, there is a contribution of a little less than ~1% as phase correction. Accordingly, the effect of the $MgF_2$ film is the prevention of the deterioration of the reflection factor of the Al film as the overcoat, namely, the improvement in the durability of the Al film.

However, the conventional reflecting mirror having such an overcoat has suffered from a disadvantage that if it is left in the atmosphere for thirty days after the formation of the film, the reflection factor thereof is reduced by 10–20% for a wavelength 180 nm used because the thickness of the $MgF_2$ film is as small as about ~550 Å.

Also, in *Applied Optics*, vol. 15, No. 9, September 1976, there is a description regarding the reflecting film of a Fabry-Perot type filter used in the ultraviolet range of a wavelength of 200 nm or more. This reflecting film is comprised of alternate layers of Al film having a thickness of ~200 Å and $MgF_2$ film and $LaF_3$ film on the Al film. The thickness of each layer of the alternate layers is optically $\lambda/4$ if the wavelength used is $\lambda$.

However, this reflecting film has a disadvantage that the number of the alternate layers is great (ten to twenty layers) because the thickness of the Al film is small. Conversely, if an attempt is made to form the alternate layers by two layers, there will also arise a disadvantage in that, because the film thickness of the dielectric material is small, the Al film is deteriorated in the ultraviolet range (particularly the vacuum ultraviolet range) and a high reflection factor cannot be maintained.

SUMMARY OF THE INVENTION

The present invention has been made in view of the above-noted disadvantages peculiar to the prior art and an object thereof is to provide an ultraviolet reflecting mirror which is excellent in reflection factor and durability.

To achieve the above object, the ultraviolet reflecting mirror according to the present invention is characterized in that one or more sets of two alternate layers of dielectric material film of low refractive index and dielectric material film of high refractive index are formed on a metal film of high reflection factor having a thickness of 250 Å or more. In the present specification, a high refractive index means a value of 1.6 or more and a low refractive index means a value less than 1.6.

In the ultraviolet reflecting mirror according to the present invention, it is desirable to use aluminum (Al) for the high reflection factor film, for the low refractive index film and the high refractive index film of dielectric materials, use magnesium fluoride ($MgF_2$) or silicon dioxide ($SiO_2$) for the low refractive index film, and use lanthanum fluoride ($LaF_3$) or neodymium fluoride ($NdF_3$) for the high refractive index film.

Also, the low refractive index film and the high refractive index film, when the wavelength used is $\lambda$, have optically a film thickness an odd number times as great as $\lambda/4$, i.e., $(2n-1)/4\ \lambda$ (n 2n integer), including the phase correction on the boundary surface with the high reflection factor film (Al film).

To enhance the reflection factor, a film of low refractive index is provided on the film of high refractive index, and the fact that this film of low refractive index has optically a film thickness of an odd number times as great as $\lambda/4$ including the phase correction has the following meaning. Where the high reflection factor film is formed of a metallic substance such as Al and where a light beam is reflected by the interface between the dielectric material layer and the metal layer, there occurs so-called skip of phase. With this skip of phase taken into account, the optical film thickness of the low refractive index film is set so that the phase of the light beam reflected by the surface of the low refractive index film and the phase of the light beam which enters the low refractive index film, is reflected by the interface between the low refractive index film and the high reflection factor film and again emerges from the low refractive index film deviated from each other by an integer times $\lambda/2$. Accordingly, actually, the optical film thickness of the low refractive film adjacent to the high reflection factor film is somewhat smaller than the film thickness an odd number times as great as $\lambda/4$.

Further, it is desirable that the geometrical film thickness of the high reflection factor film be set in the range of 250 Å–2000 Å. This is because if the film thickness is smaller than 250 Å, it is difficult to sufficiently obtain the reflection factor and the high reflection factor film loses its own durability and if the film thickness is greater than 2000 Å, the scattered light beams by the non-planarity of the surface of the high reflection factor film are increased to thereby reduce the reflection factor.

Also, it is desirable in protecting the high reflection factor film that the optical film thickness of at least one of the high refractive index film and the low refractive index film be $\frac{3}{4}\lambda$ or more. That is, it is desirable to set the film thickness so that n in $(2n-1)/4\ \lambda$ is an integer greater than 2.

DESCRIPTION OF THE PREFERRED EMBODIMENT

Figure 3:
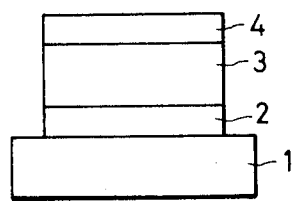
FIG. 3 shows the construction of an embodiment of the ultraviolet reflecting mirror according to the present invention.

FIG. 3 shows the construction of an embodiment of the ultraviolet reflecting mirror according to the present invention.

In FIG. 3, an Al film 2 having a thickness of $\sim 700$ Å is formed by evaporation on a glass substrate 1, an MgF$_2$ film 3 having a thickness of $\sim 750$ Å is formed by evaporation on the Al film 2, and an LaF$_3$ film 4 having a thickness of $\sim 270$ Å is formed by evaporation on the MgF$_2$ film 3.

The refractive indices of the respective film materials are n(Al)=0.1-2.0, n(MgF$_2$)=1.45 and n(LaF$_3$)=1.84 when the wavelength used is 180 nm.

In the present embodiment, the film thickness of the MgF$_2$ film 3 including the phase correction on the boundary surface with the Al film 2 is approximately $\frac{3}{4}\lambda$ and the film thickness of the LaF$_3$ film 4 is $\frac{1}{4}\lambda$.

Figure 4:
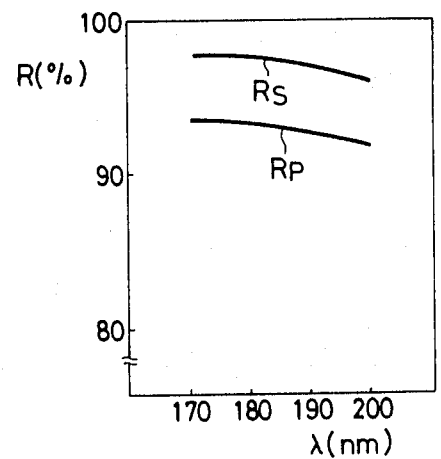
FIG. 4 is a graph showing the reflection factor characteristic of the present embodiment.

FIG. 4 is a graph showing the reflection characteristic in the present embodiment when the wavelength used is 180 nm and the angle of incidence is 45°. The reflection factors of S component and P component are Rs and Rp, respectively.

Figure 1:
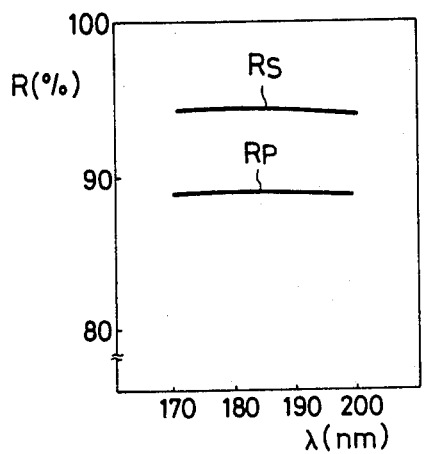
FIG. 1 is a graph showing the reflection factor characteristic of a reflecting mirror having no overcoat.
Figure 2:
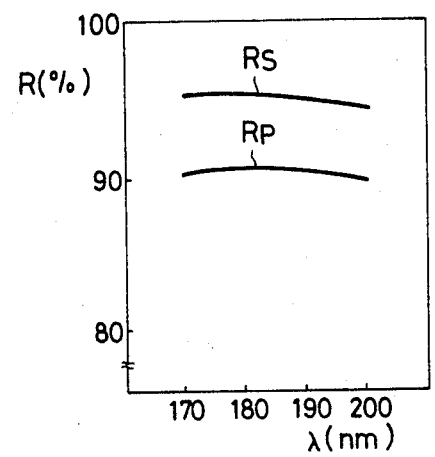
FIG. 2 is a graph showing the reflection factor characteristic of a reflecting mirror when an MgF$_2$ film is provided as the overcoat.

When this graph is compared with the graph of FIG. 2 (in the case where an MgF$_2$ film having an optical film thickness $\lambda/2$ is used), it can be seen that in the present embodiment, both of the S component and the P component are increased in reflection factor by $\sim 2\%$.

Further, durability is improved to such a degree that no reduction in reflection factor is observed even if the present embodiment is left in the atmosphere for thirty days.

Now, materials available as vacuum ultraviolet film material include LiF, CaF$_2$, Shott 8329 (trade name of the product of Shott, Inc.), SiO$_2$, AlO$_3$, MgF$_2$, LaF$_3$, NdF$_3$, MgO, etc., but the films which have cleared 1,000 hours as the result of a constant-temperature constant-humidity test at 45° C. and 95% have been Al$_2$O$_3$, Shott 8329, SiO$_2$, LaF$_3$, NdF$_3$ and MgF$_2$. Among these, Al$_2$O$_3$ film and Shott 8329 film are unsuitable because they create the absorbing action in the vacuum ultraviolet range, and further, from the condition that materials of great refractive index difference are advantageous to increase the reflection factor, LaF$_3$ and NdF$_3$ have been finally chosen as a high refractive index film and MgF$_2$ and SiO$_2$ as a low refractive index film.

The film configuration is not restricted to the present embodiment, but numerous sets of alternate layers of high refractive index film (LaF$_3$) and low refractive index film may be provided. However, since a smaller number of layers is more advantageous for the manufacture, one or two sets of alternate layers are preferable. Also, the film having an optical film thickness $\frac{3}{4}\lambda$ may be either or both of the high refractive index film (LaF$_3$, NdF$_3$) and the low refractive index film (MgF$_2$, SiO$_2$). Where both films have the optical film thickness $\frac{3}{4}\lambda$, there is an advantage that these films can be controlled by a film thickness $\frac{1}{4}\lambda$ of visible wavelength when they are formed. More specifically, when the wavelength $\lambda$ is $\sim 180$ nm, the film thickness $\frac{1}{4}\lambda$ is optically 50-60 nm even if the angle of incidence is taken into account, and it must be controlled by a wavelength of 200-250 nm when an evaporated film is actually formed. Usually, where the film thickness is controlled by an optical monitor, a halogen lamp is used to provide the range of 400-800 nm and therefore, the configuration of the film thickness $\frac{1}{4}\lambda$ cannot be made. However as described above, in the case of the film thickness $\frac{3}{4}\lambda$, the film thickness is 150-180 nm and, if this film thickness is regarded as $\frac{1}{4}\lambda$, it can be controlled by a wavelength of 600-720 nm. Further, by making the film thickness as great as $\frac{3}{4}\lambda$, the effect of protecting the high reflection factor film is improved.

As the monitoring method in a case where the high refractive index film and the low refractive index film are provided to a thickness of $\lambda/4$, use is made of a method of setting a rock crystal so that evaporated films adhere to the surface of the rock crystal, and monitoring the variation in the natural frequency of the rock crystal caused by the films adhering to the surface of the rock crystal.

Figure 5:
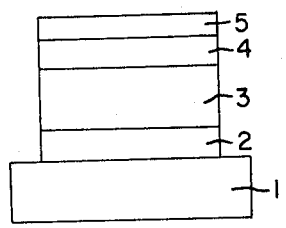
FIG. 5 shows the construction of another embodiment of the ultraviolet reflecting mirror according to the present invention.

Further, in the ultraviolet reflecting mirror according to the present invention, the embodiment shown in FIG. 3 may be provided with a low refractive index film 5 having a thickness integer an times as great as $\lambda/2$, on the outermost high refractive index film 4 as illustrated in FIG. 5 (In FIG. 5 elements 1, 2, 3 and 4 are the same as in FIG. 3 discussed supra.). The low refractive index of the outermost layer in this case optically affects the reflection factor in no way but merely functions as a protective layer.

As described above in detail, in the ultraviolet reflecting mirror according to the present invention, the reflection factor thereof can be improved by providing alternate layers of high refractive index film and low refractive index film on the high reflection factor film.

Also, by using a wavelength $\lambda$ and using a film thickness of $\frac{3}{4}\lambda$ as the film thickness of at least one of the high refractive index film and the low refractive index film, the durability of the high reflection factor film can be improved and the initial reflection factor can be maintained.

We claim:

1. An ultraviolet reflecting mirror comprising in sequence (a) a substrate; (b) a high reflection factor film provided on said substrate; and (c) one or more sets of dielectric material layers comprising a first layer of low refractive index film and a second layer of high refractive index film on said first layer; said high reflection factor film having a film thickness of at least 250 angstroms and being capable of reflecting a light beam by its surface; said higher refractive index film and said low refractive index film, each having an optical film thickness of approximately $(2n-1)\lambda/4$, wherein n is a natural number, λ is the design wavelength, and 150 nm≦λ≦300 nm; and in at least one of said sets of dielectric material layers at least one of said high refractive index film and said low refractive index film have an optical film thickness of at least $3\lambda/4$.

2. An ultraviolet reflecting mirror according to claim 1, wherein said high reflection factor film has a geometrical film thickness of 250 Å–2000 Å.

3. An ultraviolet reflecting mirror according to claim 1, wherein the substance forming said high refractive index film is $LaF_3$ or $NdF_3$ and the substance forming said low refractive index film is $MgF_2$ or $SiO_2$.

4. An ultraviolet reflecting mirror according to claim 1, further comprising an outer low refractive index film provided on the high refractive index film outermost from said substrate; said outer low refractive index film having an optical film thickness of $n\lambda/2$, wherein n is an integer and λ is the design wavelength.

5. An ultraviolet reflecting mirror comprising in sequence (a) a substrate; (b) a high reflection factor film provided on said substrate; and (c) one or more sets of dielectric material layers comprising a first layer of low refractive index film and a second layer of high refractive index film on said first layer; said high reflection factor film being capable of reflecting a light beam by its surface; said high refractive index film and said low refractive index film, each having an optical film thickness of approximately $(2n-1)\lambda/4$, wherein n is a natural number, λ is the design wavelength, and 150 nm≦λ≦300 nm; and in at least one of said sets of dielectric material layers at least one of said high refractive index film and said low refractive index film have an optical thickness of at least $3\lambda/4$.

6. An ultraviolet reflecting mirror according to claim 5 wherein said high reflection factor film consists of aluminum.

* * * * *

UNITED STATES PATENT AND TRADEMARK OFFICE
CERTIFICATE OF CORRECTION

PATENT NO. : 4,714,308

DATED : December 22, 1987

INVENTOR(S) : Mitsuharu Sawamura et al.

It is certified that error appears in the above-identified patent and that said Letters Patent is hereby corrected as shown below:

On the title page, Item [56] In The References
"3,851,973  12/1974  Mjcek...350/164" should read
-- 3,851,973  12/1974  Macek...350/164 --.

Column 2, line 24, "for", second occurrence, should read -- form --.

Column 2, line 33, "(n 2n integer), should read -- (n an integer) --.

Column 2, line 56, "refractive film" should read -- refractive index film --.

Column 4, line 39, "integer an" should read -- an integer --.

Column 4, line 68, "a natural" should read -- an integer --.

ABSTRACT
    lines 11-12, "a natural" should read -- an integer --.

Signed and Sealed this

Second Day of August, 1988

Attest:

DONALD J. QUIGG

Attesting Officer

Commissioner of Patents and Trademarks